UNITED STATES PATENT OFFICE.

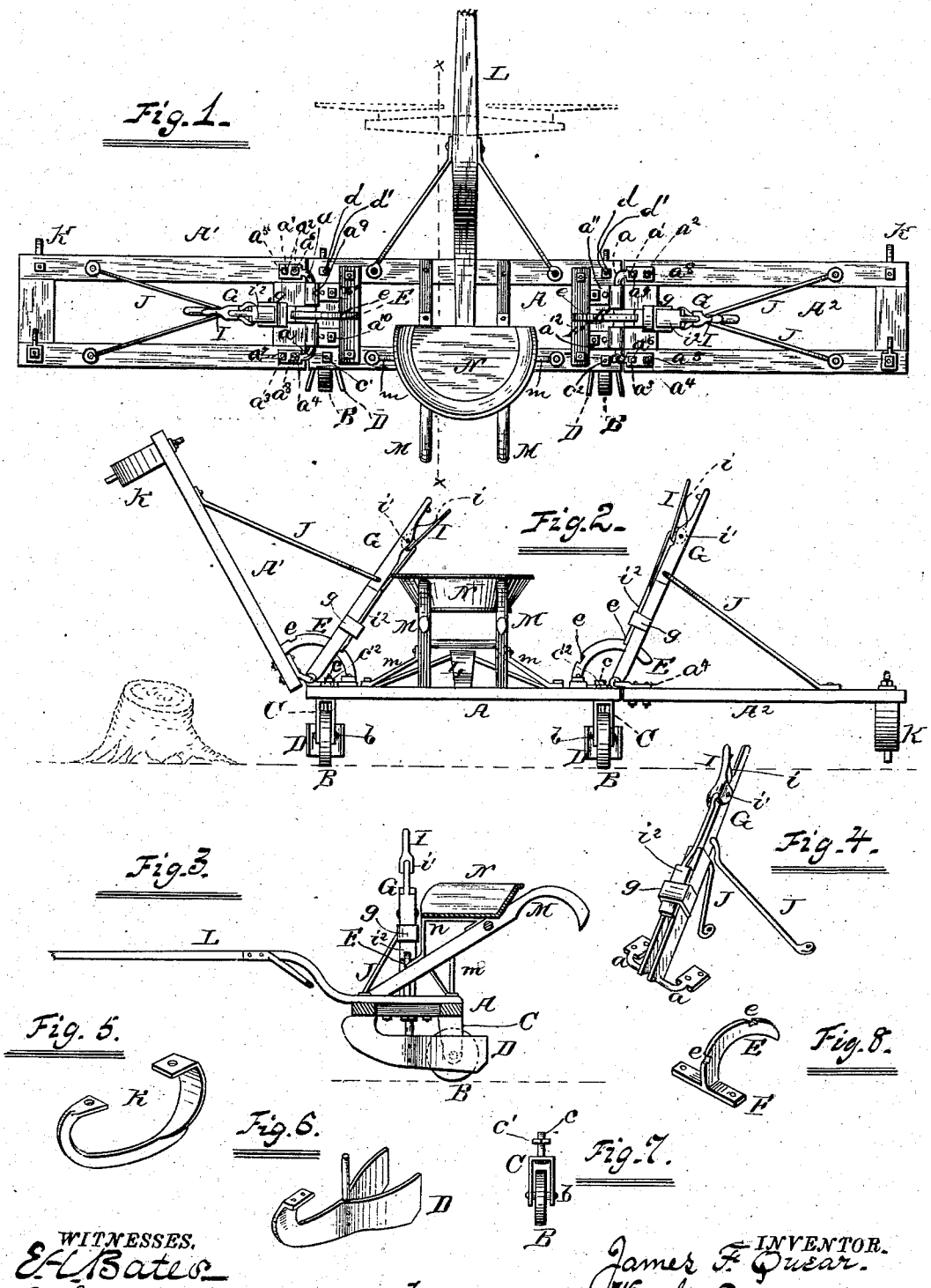

JAMES F. QUEAR, OF ARCADIA, INDIANA.

CORN-MARKER.

SPECIFICATION forming part of Letters Patent No. 240,544, dated April 26, 1881.

Application filed November 2, 1880. (No model.)

*To all whom it may concern:*

Be it known that I, JAMES F. QUEAR, a citizen of the United States, residing at Arcadia, in the county of Hamilton and State of Indiana, have invented certain new and useful Improvements in Corn-Markers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of machines known as "corn markers and furrowers," and has for its object to mark and furrow the surface of the ground in uniform rows from end to end of the field preparatory to planting corn, cotton, &c., which are to be planted in rows; and the invention consists in the construction and novel arrangement of the several parts thereof, which will be hereinafter more fully described, and pointed out in the claim.

In the accompanying drawings, Figure 1 represents a top or plan view of my improved marker and furrower. Fig. 2 is a rear view of the same. Fig. 3 is a vertical sectional view taken through line $x$ $x$, Fig. 1; and Figs. 4, 5, 6, 7, and 8 are detail views.

A $A'$ $A^2$ represent the frame of the machine, which is constructed of rectangular form and composed of three sections, the two outer sections of which, $A'$ $A^2$, being hinged to the main section A by means of bent arms or rods $a$ $a$, secured to the inner ends of said outer sections by screw-threaded bolts $a'$ $a^2$ $a^3$ $a^4$ and nuts $a^5$, $a^6$, $a^7$, and $a^8$. These bent arms form a part also of the lower ends of two bifurcated levers, and pass loosely through eyes in the hinges $a^9$, $a^{10}$, $a^{11}$, and $a^{12}$, which are firmly fastened to each end of the main section A in a manner similar to the bent arms or rods heretofore mentioned, so that the sections can be raised and adjusted to any suitable position or height that may be desired.

B B are two drive or bearing wheels, having their axles $b$ $b$ turning loosely in bearings or caster-frames C C, said bearings being rigidly secured to the under side and at each end of the main section A by screw-threaded bolts $c$ $c$ and nuts $c'$ $c^2$.

D D represent two furrowers, having their forward ends provided with cutting-edges, for the purpose of cutting stalks, roots, &c., and are curved upwardly and attached to the under side of the forward part of the main section A by screw-threaded bolts $d$ $d$, passing through said main section and secured by nuts $d'$ $d'$, and said furrowers are also still further secured in a similar manner at the centers, from which point they are bifurcated, so as to give the furrowing-shovels their proper width, and at the same time serves as a protection to the drive or bearing wheels B B from the earth when furrowing, as shown in Fig. 6 of the drawings.

E E are two segments provided with notches $e$ $e$, the lower ends of which project from two cross-bars, F F, which are rigidly attached to the central or main section, near the ends thereof, by bolts and nuts, heretofore mentioned. The other or open ends of these segments pass through levers G G. (Shown in Fig. 2.) For segments and levers see Figs. 4 and 8, respectively. The aforesaid levers are bifurcated at their lower ends to admit of the passage of the ends of said segments through them.

The lower ends of levers G G are each provided about one-third of the way from their lower ends with loops $g$ $g$, through which pass connecting-rods operated by auxiliary thumb-levers I I, the lower ends of the rods engaging with the notches $e$ $e$ of the segments E E, said levers I I having springs $i$ $i$ and pivots $i'$ $i'$, which connect the two levers, relatively, one with the other, the point of connection of these two levers being the pivotal point from which the rods I I or auxiliary levers are operated through the medium of the springs $i$ $i$ and lugs or projections $i^2$ $i^2$ on the ends of levers G G. (Shown in Fig. 4.) These lugs or projections receive the pressure of the springs $i$ $i$ upon them when the auxiliary levers are pressed against the levers G G, and by which means the lower ends of the auxiliary levers I I are disengaged from the notches in the segments, and the two sections $A'$ $A^2$ are raised or adjusted to any height that may be convenient for the operator. The aforesaid levers G G are connected to the sections $A'$ $A^2$ by means of bent rods J J, or in any suitable manner. Attached to the under side, and at the ends of these sections A' A², are two peculiarly-constructed curved cutters, K K, united at the center of the curve to flat shovels, thus forming one complete curve from the front to the rear part of the outer sections, A' A², the cutters and shovels at the point where they are united having their planes at right angles to each other, the object of the cutters being to cut stalks, &c., and prevent the furrowing-shovels from being clogged or choked up. (Shown in Fig. 5 of the drawings.)

L is the draft-pole rigidly connected to the main or central section, A, in any customary and well-known manner.

M M are two handles secured to and extending at an angle in the rear of the machine, the front and lower ends of which are bolted to the forward part of the central or main section, and braced by rods $m\,m$ to the rear part of said section.

N is the driver's seat mounted upon the handles M M, and supported thereon by angle-irons $n\,n$, attached to said handles. By thus combining the handles and seat together the operator can either ride or walk, whichever way may be most convenient to him, during the operation of the machine.

The operation of the machine is as follows: It will be obvious that when the operator is seated in his seat, and the draft is applied and motion given to the machine, it is started from one end of the field toward the other. The main section, to which the cutting and bifurcated furrowing-shovels are attached, corresponding in width to the movable or outer sections of the machine, furrows the ground in rows the same distance apart as the outer sections carrying the cutters and flat curved furrowing-shovels, and by the time the machine gets to the end of the field four rows have been already marked out and furrowed going there, and the machine is now ready for the return movement, when four more rows will be furrowed in the opposite direction to the first. Thus it will be seen that by repeating the operation from each end of the field the field can be furrowed very expeditiously and with but a very small expenditure of labor, and be ready for planting in a comparatively short time. The operator, by grasping the levers to which the outer sections are attached by the bent rods forming a part of said levers, can raise or lower either or both sections at various points over any obstacles that may interfere in furrowing the ground, and after the furrowing is completed the outer sections can be raised nearly, if not quite, perpendicular and at right angles to the main section, and be maintained fixed in that position by the lower ends of the auxiliary levers slipping into the notches of the segments by the action of the springs, when economy in room or space is required for transportation, or when the machine is at rest.

Having thus described my invention, what I claim as new, and desire to secure by Letters Patent, is—

In a corn-marker, the combination of the frame A A' A², levers G G, rods or auxiliary levers I I, segments E E, furrowing shovels and cutters D D, drive or bearing wheels B B, journaled in bearings or caster-frames C C, handles M M, and seat N, all constructed and arranged in the manner herein shown and described, and for the purpose set forth.

In testimony whereof I affix my signature in presence of two witnesses.

JAMES F. QUEAR.

Witnesses:
GRANVILLE BISHOP,
WM. QUEAR.